(12) United States Patent
Enomoto et al.

(10) Patent No.: US 6,499,351 B1
(45) Date of Patent: Dec. 31, 2002

(54) FILM PRESSURE SENSOR

(75) Inventors: Takayuki Enomoto, Yokohama (JP);
Hiroyo Okamura, Yokohama (JP);
Naobumi Kuboki, Yokohama (JP);
Kyosuke Hashimoto, Kawasaki (JP);
Takuya Nishimoto, Chigasaki (JP)

(73) Assignee: The Furukawa Electric Co., Ltd. (JP)

( * ) Notice: Subject to any disclaimer, the term of this patent is extended or adjusted under 35 U.S.C. 154(b) by 0 days.

(21) Appl. No.: 09/670,957

(22) Filed: Sep. 26, 2000

Related U.S. Application Data

(63) Continuation of application No. PCT/JP00/00254, filed on Jan. 20, 2000.

(30) Foreign Application Priority Data

Jan. 27, 1999 (JP) ............................................. 11-018963
Nov. 8, 1999 (JP) ............................................. 11-317233

(51) Int. Cl.$^7$ ................................................ G01L 19/04
(52) U.S. Cl. ....................................................... 73/708
(58) Field of Search ......................... 73/708, 709–715, 73/716, 717, 718–722, 727; 374/179

(56) References Cited

U.S. PATENT DOCUMENTS

| | | | |
|---|---|---|---|
| 3,806,471 A | 4/1974 | Mitchell | |
| 4,320,664 A * | 3/1982 | Rehn et al. | 73/708 |
| 4,577,510 A * | 3/1986 | Bur et al. | 73/708 |
| 5,107,710 A | 4/1992 | Huck et al. | |
| 5,303,593 A * | 4/1994 | Kremidas | 73/708 |
| 5,447,073 A * | 9/1995 | Kalinoski | 73/719 |
| 5,450,754 A | 9/1995 | Biebl et al. | 73/718 |
| 5,511,427 A * | 4/1996 | Burns | 73/708 |

FOREIGN PATENT DOCUMENTS

| | | |
|---|---|---|
| DE | 197273 | 4/1908 |
| JP | 10-19703 | 1/1998 |
| JP | 10-115564 | 5/1998 |

OTHER PUBLICATIONS

Copy of Supplemental European search report dated Feb. 6, 2002.

* cited by examiner

*Primary Examiner*—Harshad Patel
(74) *Attorney, Agent, or Firm*—Knobbe, Martens, Olson & Bear, LLP

(57) ABSTRACT

A film pressure sensor to be interposed between a cover of an automotive seating equipment and a seat cushion material thereof and used suitably for measuring pressure to be applied to the seating equipment. A temperature sensing area (25) for sensing the temperature of a pressure sensing area (23) is formed on an insulating film (21*a* or 21*b*) of the film pressure sensor (20) using a substance whose electrical resistance changes depending on the temperature. Errors in pressure measurement to be caused by change in the temperature can be reduced or removed by utilizing the temperature determined by the temperature sensing area (25).

3 Claims, 8 Drawing Sheets

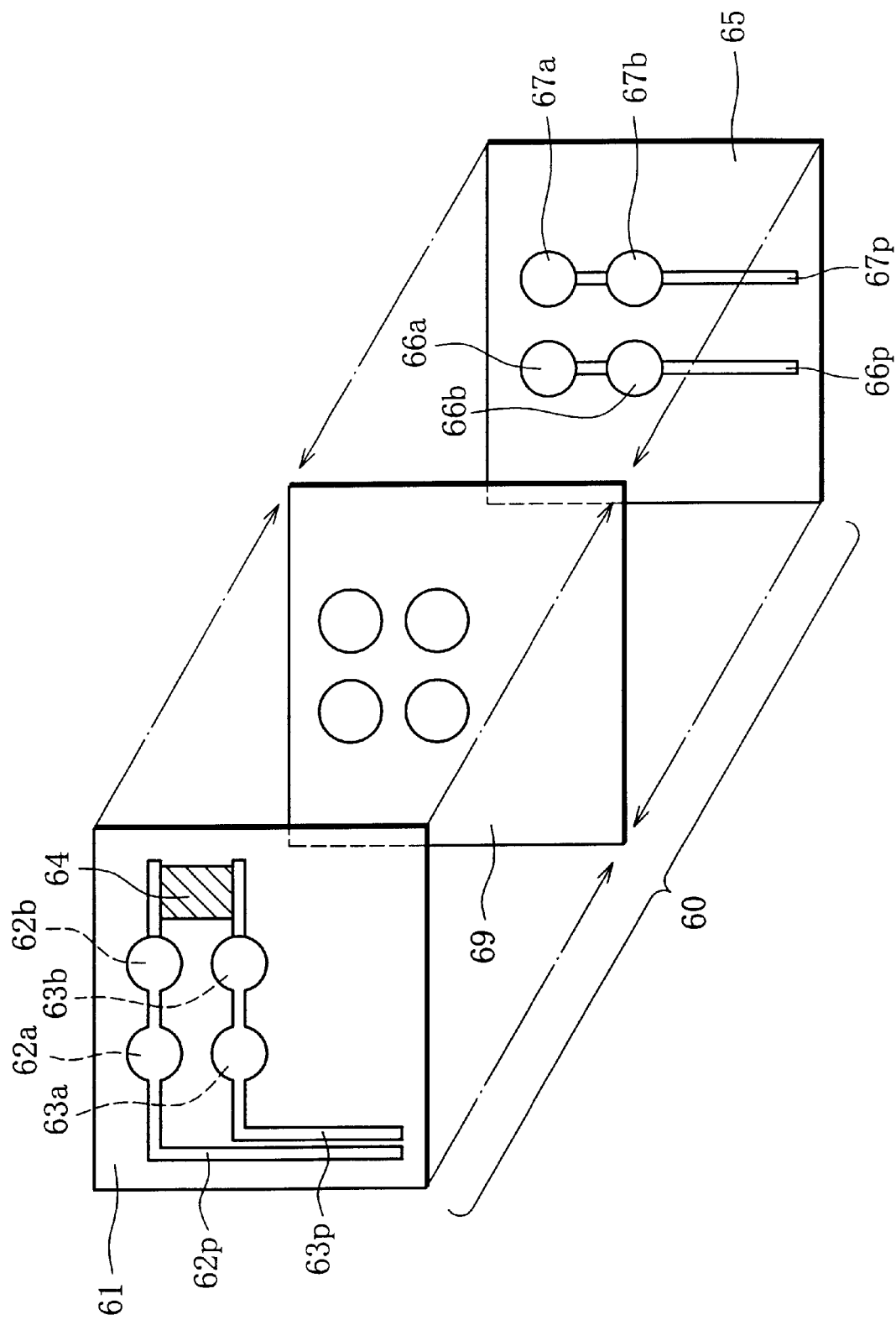

-- PRIOR ART --

FILM PRESSURE SENSOR

This application, claims priority under 35 U.S.C. Section 120 to International Application No. PCT/JP00/00254, filed on Jan. 20, 2000. The disclosure of this application is hereby incorporated by reference in its entirety.

TECHNICAL FIELD

The present invention relates to a film pressure sensor in which errors in pressure measurement to be caused by temperature changes are reduced or removed.

BACKGROUND ART

Conventionally, a film pressure sensor is attached, for example, to an automotive seating equipment between its cover and a seat cushion material such as urethane so as to sense whether a passenger is seated or not on the seating equipment using the same.

An example of such film pressure sensor 10 is shown in FIGS. 12 and 13. The film pressure sensor 10 is of a constitution in which two insulating films each having a predetermined circuit pattern and a pressure-sensitive layer formed on one side are laminated via an insulating layer such that the pressure-sensitive layers of them oppose each other.

More specifically, the insulating films 11a and 11b are soft insulating plastic films such as of PET. Circuit patterns 12a and 12b are also formed on the insulating films 11a and 11b respectively. Here, the circuit patterns 12a and 12b are formed on the insulating films 11a and 11b by applying thereto metal foils formed to have predetermined patterns or by printing a conductive coating such as a silver ink to form predetermined patterns on the insulating films 11a and 11b, respectively. Further, pressure-sensitive layers 13a and 13b are printed on the circuit patterns 12a and 12b in predetermined positions, respectively. The pressure-sensitive layers 13a and 13b each have a substantially circular shape and are made of a resin composition, for example, a mixture of a polyurethane resin, carbon and an inorganic filler.

The insulating layer 14 is an insulating film such as of PET, and an adhesive is applied to both sides of it. The insulating layer 14 is punched only at such a part as opposes the pressure-sensitive layers 13a and 13b. The insulating layer 14 is adapted to be interposed between the insulating films 11a and 11b. Here, the insulating layer can be formed on one insulating film. In this case, the insulating layer can be formed by applying an adhesive layer, by means of printing or the like, on one insulating film excluding the area opposing the pressure-sensitive layers.

The thus constituted film pressure sensor 10 is designed to carry out pressure sensing over the area of the pressure-sensitive layers 13a and 13b arranged to oppose each other with a predetermined clearance secured therebetween. That is, when pressure is applied in one direction indicated by the arrow P or Q shown in FIG. 13 or in two directions P and Q, one of or both of the insulating films 11a and 11b is or are deformed elastically to bring the pressure-sensitive layers 13a and 13b into contact with each other and to cause a change in the contact resistance between the pressure-sensitive layers 13a and 13b depending on the pressure level. This change in the contact resistance is electrically sensed through the circuit patterns 12a and 12b to measure the pressure to be applied to the film pressure sensor 10.

The insulating films 11a and 11b, the pressure-sensitive layers 13a and 13b, the circuit patterns 12a and 12b, the insulating layer 14, etc. constituting the film pressure sensor 10 are of materials which are liable to undergo great temperature-dependent changes in terms of electrical properties including electrical resistance and physical properties including hardness. Accordingly, the hardness of the insulating films 11a and 11b, the contact resistance between the pressure-sensitive layers 13a and 13b, and electrical resistance of the circuit patterns 12a and 12b change with a temperature change, so that the sensed pressure value varies depending on the temperature even if the same pressure is applied to the sensor. Thus, the pressure to be applied to the film pressure sensor 10 cannot be measured accurately.

This sometimes gives rise to a problem particularly when the film pressure sensor 10 is attached to an automotive seating equipment. More specifically, in a comparison of the daytime temperature in the summer and the night temperature in the winter in an automotive cabin in one and the same district, there are cases where there is a difference of about 50° C. or more. Such differences in the automotive cabin temperature as described above can occur between countries or districts where automobiles are used. Accordingly, when the film pressure sensor 10 is used in an automotive seating equipment, it is difficult to carry out accurate pressure sensing due to such differences in the automotive cabin temperature.

It is an objective of the present invention to provide a film pressure sensor in which errors in pressure measurement attributed to temperature changes are reduced or removed.

SUMMARY

In order to attain the above objective, the film pressure sensor according to the present invention is characterized in that it contains a temperature sensing area which is formed on an insulating-film and senses the temperature of a pressure sensing area. The temperature sensing area is formed using a substance whose electrical resistance changes depending on the temperature.

Since the temperature sensing area measures accurately the temperature of the pressure sensing area, temperature-dependent errors in pressure measurement which are likely to be observed notably in film pressure sensors can be reduced or removed.

The film pressure sensor in one embodiment of the present invention is characterized in that a circuit pattern constituting the temperature sensing area is partly used commonly as a part of a circuit pattern constituting the pressure sensing area.

The number of circuit pattern terminals is reduced, and errors to be caused by temperature changes in the pressure measurement made by the film pressure sensor are reduced or removed by sensing the temperature of the pressure sensing area in the temperature sensing area.

In the film pressure sensor in another embodiment of the present invention, the temperature of the pressure sensing area is measured utilizing a change in an electrical resistance of the circuit pattern constituting the pressure sensing area caused by a temperature change.

Simpler circuit patterns are used to reduce the number of circuit pattern terminals and also to reduce or remove errors to be caused by temperature changes in the pressure measurement made by the film pressure sensor by sensing the temperature of the pressure sensing area.

The film pressure sensor in another embodiment of the present invention is characterized in that temperatures of the pressure sensing area and around this area are measured utilizing a change in the temperature-dependent electrical resistance of the temperature sensing area formed in the vicinity of a pressure-sensitive part of the pressure sensing area.

The temperature sensing area measures the temperature of the pressure-sensitive part that is influenced most significantly by temperature change and securely reduces or removes errors in pressure measurement.

BRIEF DESCRIPTION OF THE DRAWINGS

FIG. 7 is a plan view of the film pressure sensor according to a fifth embodiment of the present invention;

DETAILED DESCRIPTION

Figure 1:
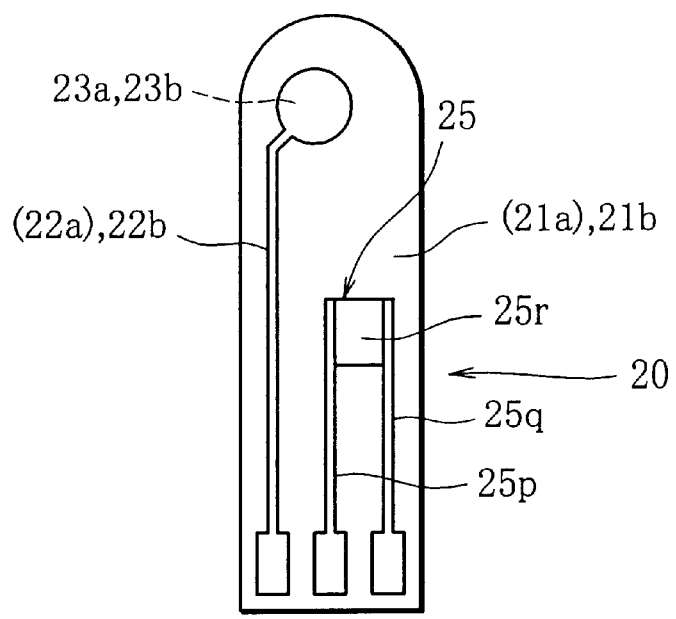
FIG. 1 is plan view of the film pressure sensor according to a first embodiment of the present invention.

The film pressure sensor according to a first embodiment of the present invention will be described referring to the drawings.

Figure 2:
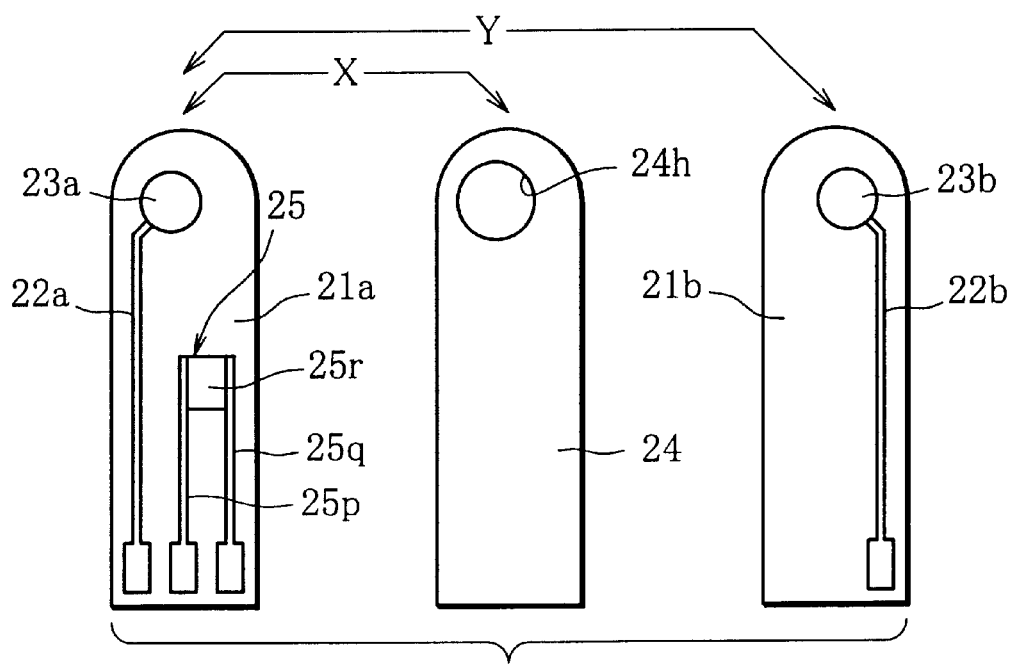
FIG. 2 is an exploded view of the film pressure sensor shown in FIG. 1.

As shown in FIG. 1 in a complete state and in FIG. 2 in an exploded state, the film pressure sensor 20 according to the first embodiment of the present invention is of a constitution in which a first insulating film 21a and a second insulating film 21b are laminated via an insulating layer 24 as indicated by the arrows X and Y. A circuit pattern 22a and a pressure-sensitive layer 23a are formed on one side (upper side in FIG. 2) of the first insulating film 21a in predetermined positions respectively, and a temperature sensing area 25 is also formed on the same side parallel to the circuit pattern 22a. Meanwhile, a circuit pattern 22b and a pressure-sensitive layer 23b are formed on one side (upper side in FIG. 2) of the second insulating film 21b in predetermined positions respectively. The pressure-sensitive layers 23a and 23b are opposed to each other with a predetermined clearance being secured therebetween via the insulating layer 24.

The first insulating film 21a, like in the conventional film pressure sensor 10, is a soft insulating plastic film such as of PET. The circuit pattern 22a on the insulating film 21a is formed by applying a metal foil thereto. Meanwhile, the pressure-sensitive layer 23a formed on the circuit pattern 22a in a predetermined position has a substantially circular shape. The pressure-sensitive layer 23a is formed, for example, by printing a resin composition such as a mixture of a polyurethane resin, carbon and an inorganic filler in a predetermined position. Here, the circuit pattern 22a may be formed by printing a conductive coating such as a silver ink or a platinum paste on the insulating film in a predetermined pattern.

Figure 3:
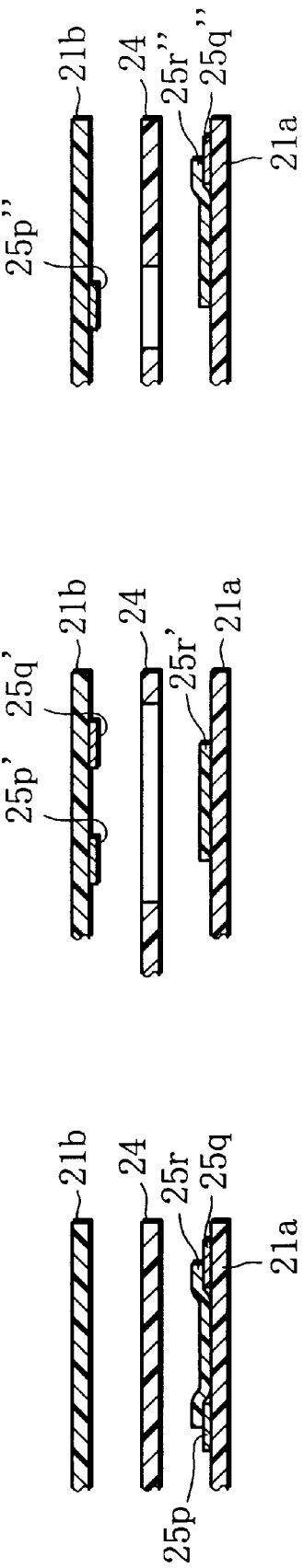
FIGS. 3A to 3C are cross-sectional views showing the temperature sensing area of the film pressure sensor shown in FIG. 1 and variations thereof, in each of which the insulating films and the insulating layer are shown to be spaced from one another.

The temperature sensing area 25 is formed adjacent to the circuit pattern 22a on the first insulating film 21a and is composed of circuit patterns 25p and 25q and a temperature-sensitive layer (temperature-sensitive part) 25r. The circuit patterns 25p and 25q are arranged parallel to each other on the insulating film 21a with a predetermined clearance being secured therebetween. The temperature-sensitive layer 25r is formed to be in contact with the distal ends of the circuit patterns 25p and 25q, as shown in FIG. 3A.

The circuit patterns 25p and 25q are formed, for example, by printing a conductive coating such as a silver ink on the insulating film; whereas the temperature-sensitive part 25r is formed using a substance whose electrical resistance changes depending on the temperature, such as a polyurethane resin and a carbon ink.

The second insulating film 21b is also made of the same material as the first insulating film 21a. A metal foil circuit pattern 22b is formed on the insulating film 21b, and a substantially circular pressure-sensitive layer 23b is formed on the circuit pattern 22b using the same material as the pressure-sensitive layer 23a. Here, the pressure-sensitive layer 23b is formed in a position where it opposes the pressure-sensitive layer 23a of the first insulating film 21a when the first insulating film 21a and the second insulating film 21b are laminated via the insulating layer 24.

Figure 13:
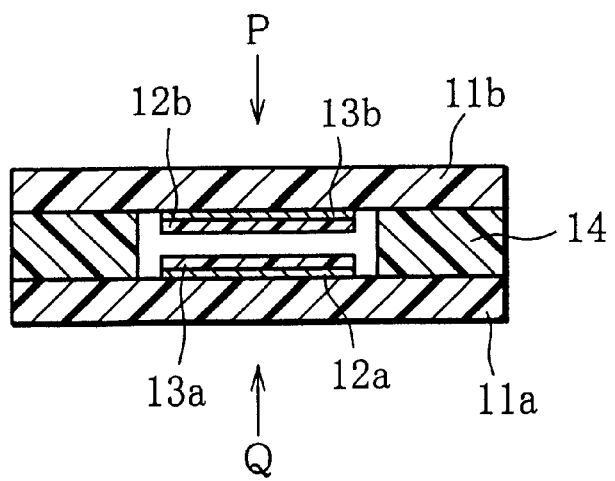
FIG. 13 is a cross-sectional view taken along the line XIII—XIII in FIG. 12.

The insulating layer 24 sandwiched between the first insulating film 21a and the second insulating film 21b has substantially the same shape as these insulating films 21a and 21b. The insulating layer 24 also has an opening 24h slightly greater than the pressure-sensitive layers 23a and 23b so that the pressure-sensitive layer 23a of the first insulating film 21a is brought into contact with the pressure-sensitive layer 23b of the second insulating film 21b, when a certain pressure is acted upon the film pressure sensor 20, like in the prior art example shown in FIG. 13.

The insulating layer 24 is an insulating film such as of PET like the conventional insulating layer 14, and the insulating films 21a and 21b are adhered to the insulating layer 24 by an adhesive. Here, the insulating layer may be formed by applying a predetermined thickness of adhesive by means of printing and the like to one of the insulating films 21a and 21b.

The circuit pattern 22a and pressure-sensitive layer 23a on the first insulating film 21a, the circuit pattern 22b and pressure-sensitive layer 23b on the-second insulating film 21b, as well as, the insulating layer 24 and the insulating films 21a and 21b present around these areas constitute a pressure sensing area 23, while the circuit patterns 25p and 25q and the temperature-sensitive layer 25r constitute the temperature sensing area 25.

Further, connection terminals (opposite ends from the pressure-sensitive layers) of the circuit patterns 22a and 22b of the pressure sensing area 23, and the connection terminals (opposite ends from the temperature-sensitive layers) of the circuit patterns 25p and 25q of the temperature sensing area 25 are exposed on the surface of the film pressure sensor 20 to provide connection terminals for external counterparts (not shown).

Since the film pressure sensor 20 is of the constitution as described above, the contact resistance between the pressure-sensitive layers 23a and 23b changes when pressure is applied from one side or both sides, and the pressure to be applied to the film pressure sensor 20 can be measured by electrically sensing this change in the contact resistance through the connection terminals of the circuit patterns 22a and 22b.

Meanwhile, the temperature-sensitive layer 25r is made of a substance whose electrical resistance changes depending on the temperature. Such change in the electrical resistance can be electrically sensed through the connection terminals of the circuit patterns 25p and 25q, for example, as a change in the voltage. Since the temperature-characteristic of the electrical resistance of the substance forming the temperature-sensitive layer 25r is known beforehand, the sensed value is inputted to an operating section of a pressure measuring circuit (not shown), and thus the temperature of the film pressure sensor 20 can be measured accurately. The pressure value measured by the film pressure sensor 20 is corrected using the thus measured temperature and achieve reduction or removal of temperature-dependent errors in the pressure measurement.

It should be noted here that both the circuit patterns 25p and 25q and the temperature-sensitive layer 25r constituting the temperature sensing area 25 may not be formed on one insulating film 21a. Instead, as shown in FIG. 3B, circuit patterns 25p' and 25q' may be formed on one insulating film 21b, and a temperature-sensitive layer 25r' may be formed on the other insulating film 21a. In this case, the temperature-sensitive layer 25r' is adapted to be brought into contact with the circuit patterns 25p' and 25q' when the insulating films 21a and 21b are laminated via the insulating layer 24.

Further, as shown in FIG. 3C, a circuit pattern 25q" and a temperature-sensitive layer 25r" may be formed on one insulating film 21a, and a circuit pattern 25p" may be formed on the other insulating film 21b. In this case, a temperature sensing area 25" is designed to be formed when the insulating films 21a and 21b are laminated via the insulating layer 24. In those cases shown in FIGS. 3B and 3C, it is essential to form an opening for forming the temperature sensing area in a predetermined position of the insulating layer so as to secure contact between the circuit patterns and the temperature-sensitive layer.

Next, the film pressure sensor according to a second embodiment of the present invention will be described.

In the following, the same and like components as in the film pressure sensor 20 of the first embodiment are affixed with the corresponding numbers respectively, and detailed description of them will be omitted.

Figure 4:
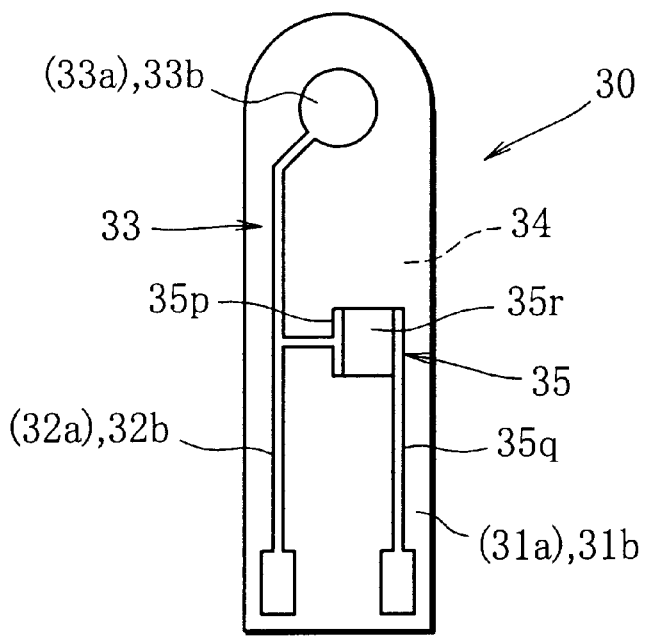
FIG. 4 is a plan view of the film pressure sensor according to a second embodiment of the present invention.

As shown in FIG. 4, the film pressure sensor 30 of the second embodiment has a first insulating film 31a, a second insulating film 31b and an insulating layer 34 interposed therebetween.

A circuit pattern 32a and a pressure-sensitive layer 33a for pressure sensing are formed on the first insulating film 31a; while a circuit pattern 32b and a pressure-sensitive layer 33b for pressure sensing, as well as, circuit patterns 35p and 35q and a temperature-sensitive layer 35r for temperature sensing are formed on the second insulating film 31b. That is, unlike the film pressure sensor 20 according to the first embodiment, where the pressure sensing area 23 and the temperature sensing area 25 are formed to be insulated and to be electrically independent from each other, the film pressure sensor of this embodiment is characterized in that one circuit pattern 32b constituting a pressure sensing area 33 and one circuit pattern 35p constituting a temperature sensing area 35 are electrically connected.

According to this constitution, the four terminals of the circuit patterns 22a, 22b, 25p and 25q present in total in the film pressure sensor 20 of the first embodiment can be reduced to three terminals, facilitating the operation of wiring the terminals with counterparts outside the sensor.

Further, a film pressure sensor according to a third embodiment of the present invention will be described.

Figure 5:
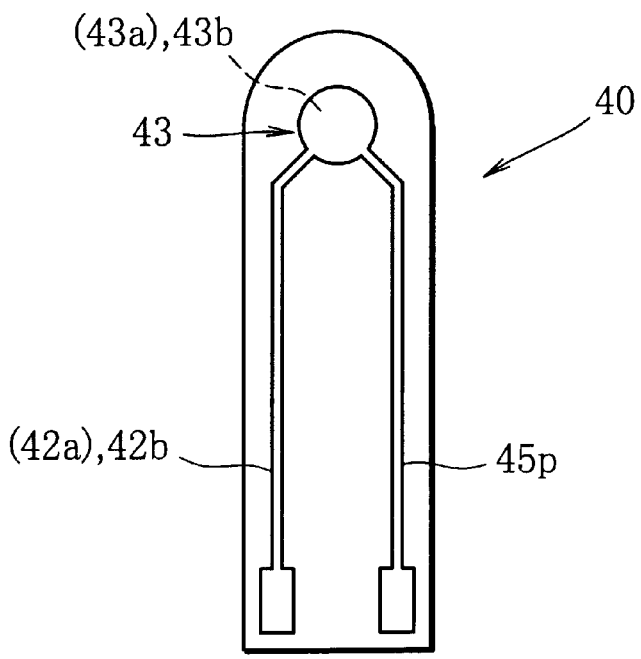
FIG. 5 is a plan view of the film pressure sensor according to a third embodiment of the present invention.

As shown in FIG. 5, in the film pressure sensor 40 of the third embodiment, one circuit pattern 42b constituting a pressure sensing area 43 is formed by applying by means of printing a conductive coating such as a silver ink, and further a temperature-sensing circuit pattern 45p is extended to this circuit pattern 42b.

Since the electrical resistance of the conductive coating such as a silver ink changes depending on the temperature, the pressure to be applied to the film pressure sensor is measured by measuring the electrical resistance values in the other circuit pattern 42a, pressure-sensitive layers 43a and 43b and the circuit pattern 42b, and also the temperature is measured utilizing the change in the electrical resistance values in the circuit patterns 42b and 45p. Thus, the pressure sensed by the pressure sensing area can be corrected using the thus measured temperature data. Accordingly, temperature-dependent errors in pressure measurement can be reduced or removed.

This constitution can reduce the number of the circuit pattern terminals like in the film pressure sensor 30 of the second embodiment. Besides, since the circuit patterns 42b and 45p per se constitute the temperature sensing area, there is no need of forming a temperature-sensitive layer of a material, such as a polyurethane resin and a carbon ink, whose electrical resistance changes depending on the temperature, reducing the number of steps in the manufacture of film pressure sensors 40.

Further, a film pressure sensor according to a fourth embodiment of the present invention will be described.

Figure 6:
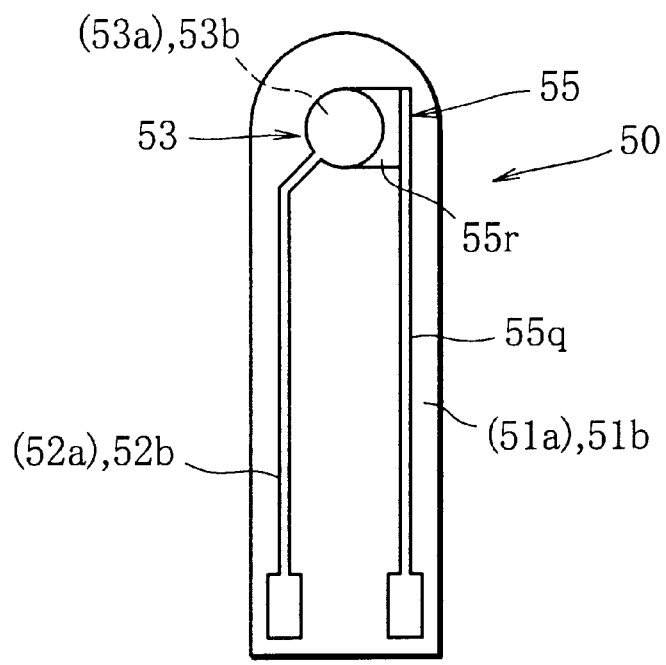
FIG. 6 is a plan view of the film pressure sensor according to a fourth embodiment of the present invention.

As shown in FIG. 6, in the film pressure sensor 50 of the fourth embodiment, a pressure-sensitive layer 53a is formed on an insulating film 51a via a circuit pattern 52a, and a temperature-sensitive layer 55r is extended from the pressure-sensitive layer 53a. A pressure-sensitive layer 53b is formed on an insulating film 51b via a circuit pattern 52b, and a circuit pattern 55q is formed also thereon. The distal end of the circuit pattern 55q is connected to the temperature-sensitive layer 55r. Here, the circuit patterns 52a and 52b and the circuit pattern 55q are formed by applying metal foils or printing a conductive coating such as a silver ink, while the temperature-sensitive layer 55r is formed using a resin composition, for example, a mixture of a polyurethane resin, carbon and an inorganic filler.

Since the film pressure sensor 50 has the above constitution, the pressure is measured through the circuit pattern 52a, pressure-sensitive layers 53a and 53b and circuit pattern 52b, and also the temperature is measured through the circuit pattern 52a, temperature-sensitive layer 55r and circuit pattern 55q. The result of this temperature measurement can be utilized for compensation of the pressure sensed in the pressure sensing area. Thus, temperature-dependent errors in pressure measurement can be reduced or removed.

It should be noted here-that since the temperature-sensitive layer 55r is formed adjacent to the pressure-sensitive layer 53a, not only the temperature of the portion where temperature-dependent changes in the electrical resistance are most likely to occur in pressure measurement can be measured securely, but also the number of the circuit pattern terminals can be reduced.

Further, a film pressure sensor according to a fifth embodiment of the present invention will be described.

As shown in the exploded view of FIG. 7, the film pressure sensor 60 of the fifth embodiment is a variation of the film pressure sensor 30 of the second embodiment.

More specifically, a matrix of pressure sensing areas (four in FIG. 7) and one temperature sensing area are formed on an insulating film. That is, two circuit patterns 62p and 63p are formed on an insulating film 61 parallel to each other vertically and horizontally in FIG. 7. Meanwhile, pressure-sensitive layers 62a and 62b are located on the circuit pattern 62p at a predetermined interval, while pressure-sensitive layers 63a and 63b are located on the circuit pattern 63p at a predetermined interval.

The circuit patterns 62p and 63p are connected at the distal ends to a temperature-sensitive layer 64, while the proximal ends of the circuit patterns 62p and 63p are exposed on the surface of the film pressure sensor 60 to provide connection terminals for external counterparts (not shown). It should be noted here that the pressure-sensitive layers 62a, 62b, 63a and 63b each have a substantially circular shape and are formed by printing a resin composition, for example, a mixture of a polyurethane resin, carbon and an inorganic filler in predetermined positions respectively. Further, the circuit patterns 62p and 63p are formed by applying metal foils or by printing a conductive coating such as a silver ink, while the temperature-sensitive layer 64 is formed using a resin composition, for example, a mixture of a polyurethane resin, carbon and an inorganic filler.

Two circuit patterns 66p and 67p are formed on an insulating film 65 vertically in FIG. 7 like in the insulating film 61. Pressure-sensitive layers 66a and 66b are located on the circuit pattern 66p; while pressure-sensitive layers 67a and 67b are located on the circuit pattern 67p. However, these two circuit patterns 66p and 67p are not connected to each other by the temperature-sensitive layer but are electrically independent from each other. Here, the pressure-sensitive layers 66a, 66b, 67a and 67b, and the circuit patterns 66p and 67p are made of the same materials as the corresponding pressure-sensitive layers and circuit patterns formed on the insulating film 61.

Figure 8:
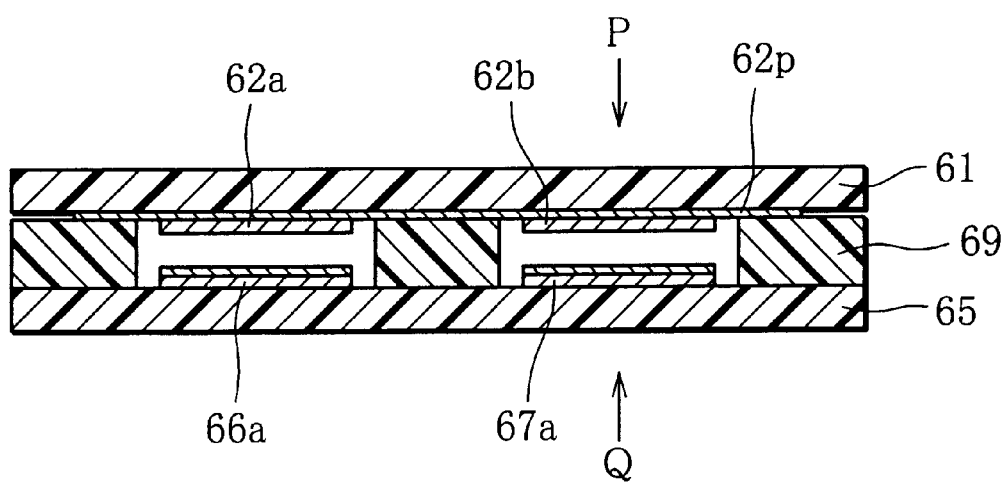
FIG. 8 is a cross-sectional view taken along the upper row of pressure-sensitive layers in FIG. 7.

As shown in FIG. 8, an insulating layer 69 is designed to have a configuration (including shape, thickness and opening) like in the above embodiment such that a predetermined clearance is secured between every two opposing pressure-sensitive layers when the insulating film 61, the insulating layer 69 and the insulating film 65 are laminated, and that every two opposing pressure-sensitive layers are brought into contact with each other when a predetermined pressure is acted upon them.

Accordingly, the film pressure sensor 60 of this embodiment can readily be completed by laminating the insulating film 61, the insulating layer 69 and the insulating film 65.

The film pressure sensor 60 having the constitution as described above can determine the temperature around the pressure-sensitive layers by measuring resistance values in the circuit pattern 62p, the temperature-sensitive layer 64 and the circuit pattern 63p. The results of this temperature measurement can be utilized for compensation of the pressure sensed in each pressure sensing area. Thus, temperature-dependent errors in pressure measurement can be reduced or removed.

Since four pressure sensing areas are formed on the insulating films, the shape of an object pressing the insulating films can be determined as follows. That is, the pressure at the pressure sensing area formed by the pressure-sensitive layer 62a and the pressure-sensitive layer 66a is sensed by sensing a change in the resistance value between the circuit pattern 62p and the circuit pattern 66p, and likewise the pressure at the pressure sensing area formed by the pressure-sensitive layer 62b and the pressure-sensitive layer 67a is sensed based on a change in the resistance value between the circuit pattern 62p and the circuit pattern 67p, while the pressure at the pressure sensing area formed by the pressure-sensitive layer 63a and the pressure-sensitive layer 66b is sensed based on a change in the resistance value between the circuit pattern 63p and the circuit pattern 66p. Further, the pressure at the pressure sensing area formed by the pressure-sensitive layer 63b and the pressure-sensitive layer 67b is sensed based on a change in the resistance value between the circuit pattern 63p and the circuit pattern 67p. Thus, in the matrix of pressure sensing areas, the pressure to be applied to each pressure sensing area can be sensed accurately, and thus the shape of an object present on the film pressure sensor 60 can be determined.

Further, since the temperature sensing area is formed by connecting the temperature-sensitive layer 64 to the distal ends of the circuit patterns 62p and 63p, these circuit patterns can be used commonly for pressure sensing and temperature sensing. Thus, the film pressure sensor 60 can carry out temperature sensing without increasing the number of circuit pattern terminals for temperature sensing, facilitating wire connecting of the terminals with counterparts outside the sensor.

Next, a variation of the film pressure sensor 60 according to the above fifth embodiment will be described.

Figure 9:
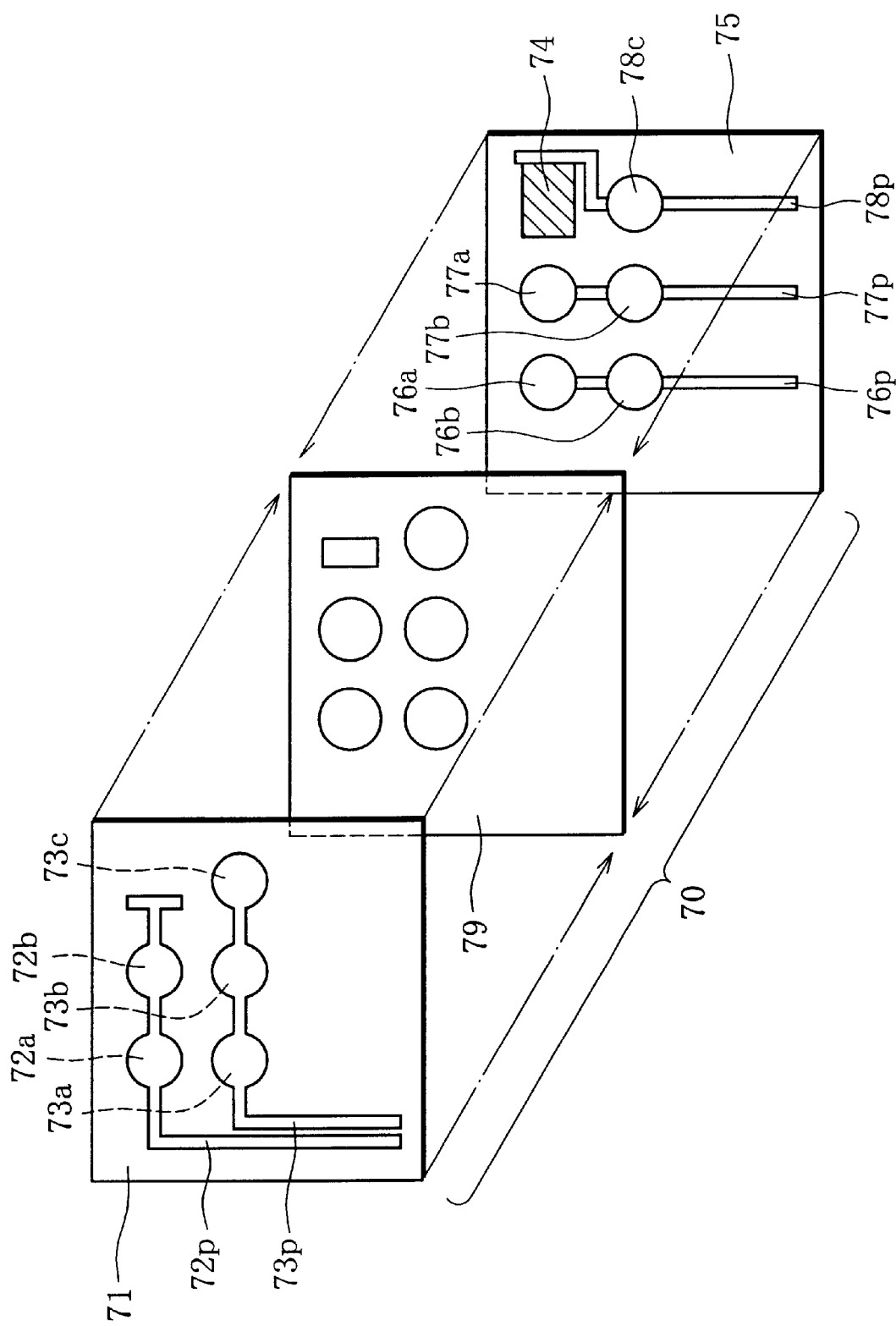
FIG. 9 is a plan view showing a variation of the film pressure sensor shown in FIG. 7.

This film pressure sensor 70 has an insulating film 71, an insulating layer 79 and an insulating film 75 laminated as shown in FIG. 9. On the insulating film 71 are formed pressure-sensitive layers 72a and 72b via a circuit pattern 72p, as well as, pressure-sensitive layers 73a, 73b and 73c via a circuit pattern 73p. Meanwhile, on the insulating film 75 are formed pressure-sensitive layers 76a and 76b via a circuit pattern 76p, while pressure-sensitive layers 77a and 77b via a circuit pattern 77p, and a pressure-sensitive layer 78c via a circuit pattern 78p. Further, a temperature-sensitive layer 74 is formed on the insulating film 75. The temperature-sensitive layer 74 is connected at one side to the distal end of the circuit pattern 78p. Here, the pressure-sensitive layers formed on the insulating film 71 and those formed on the insulating film 75 are arranged on the corresponding circuit patterns formed on the insulating films respectively such that each pressure-sensitive layer on the former opposes the counterpart in the latter when a film pressure sensor 70 is completed. Likewise, the distal end of the circuit pattern 72p is extended to such a position as is opposed to the other side of the temperature-sensitive layer 74, when the film pressure sensor 70 is completed.

The insulating layer 79 has a configuration (including shape, thickness and opening) such that a predetermined clearance is secured between every two opposing pressure-sensitive layers when the film pressure sensor 70 is completed, and that every two opposing pressure-sensitive layers are brought into contact with each other when a predetermined pressure is acted upon them. The insulating layer 79 has an opening for allowing the distal end of the circuit pattern 72p to be brought into contact with the other side of the temperature-sensitive layer 74, when the film pressure sensor 70 is completed.

Figure 10:
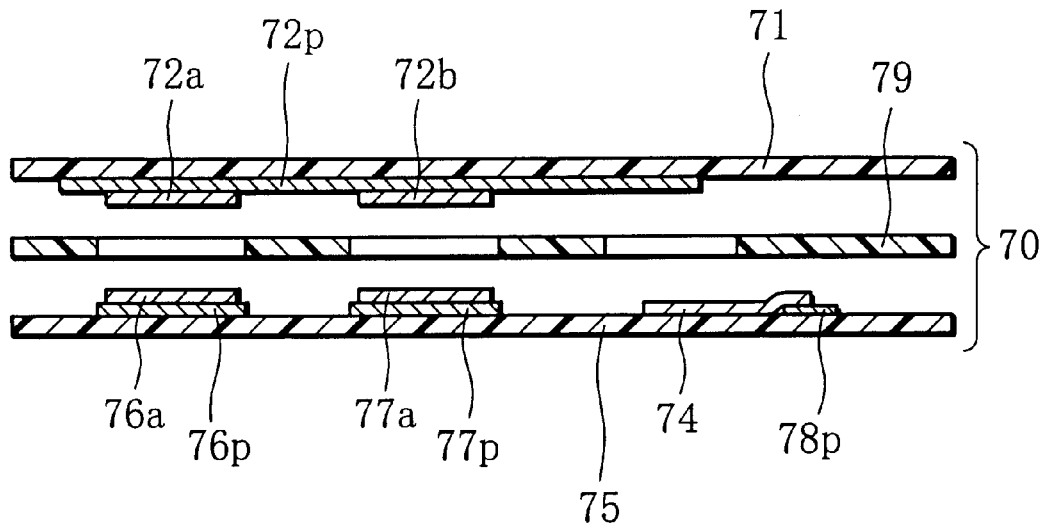
FIG. 10 is a cross-sectional view taken along the upper row of pressure-sensitive layers and temperature-sensitive layer shown in FIG. 9, in which the insulating films and the insulating layer are shown to be spaced from one another.

According to the above constitution, the film pressure sensor 70 can readily be completed by arranging the insulating films and laminating them, as shown in FIG. 10.

Then, temperature is measured through the circuit pattern 72p, temperature-sensitive layer 74 and circuit pattern 78p of the film pressure sensor 70; whereas resistance value (pressure) between the pressure-sensitive layers 72a and 76a is measured through the circuit patterns 72p and 76p. Further, the resistance value (pressure) between the pressure-sensitive layers 72b and 77a is measured through the circuit patterns 72p and 77p. Likewise, with respect to the lower three pressure sensing areas (in FIG. 9), resistance value (pressure) of each area is measured through the circuit pattern 73p and a counterpart suitably selected from the circuit patterns 76p, 77p and 78p.

As described above, since pressure is measured in each pressure sensing area like in the above film pressure sensor 60, the film pressure sensor 70 can determine the shape of an object pressing it. Further, the circuit patterns are used commonly for pressure sensing areas and for the temperature sensing area, enabling sensing of the temperature of the film pressure sensor requiring no extra circuit pattern terminals for temperature sensing. The result of temperature measurement can be utilized for compensation of the pressure sensed in each pressure sensing area. Thus, temperature-dependent errors in pressure measurement can be reduced or removed.

It is without saying that the number of pressure sensors to be arranged forming a matrix on the insulating films and that of the temperature sensor are not limited to those as described in the above embodiment.

As described above, by forming the temperature sensing area using, for example, a metal foil, a silver ink, a polyurethane resin or a carbon ink, no protrusion is formed as a temperature sensor partly on the film pressure sensor. Thus, the film pressure sensor is allowed to have an overall small thickness, so that even if the film pressure sensor is interposed between a cover of an automotive seating equipment and a seat cushion thereof, no unnecessary protrusion is formed on the seat, securing comfort for a passenger seated thereon.

Figures 11A, 11B:
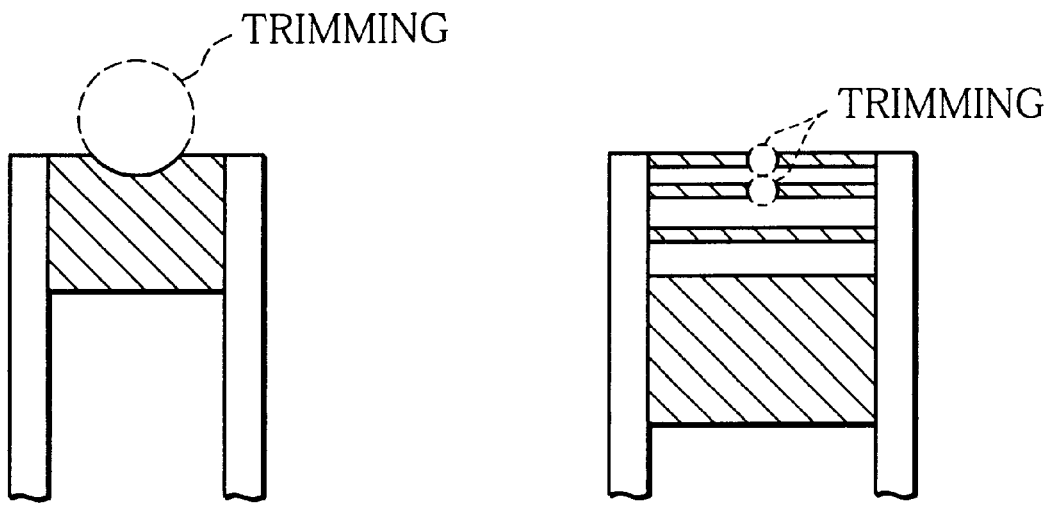
FIGS. 11A and 11B are views showing variations of the temperature sensing area in the film pressure sensor according to the embodiments of the present invention.
Figure 12:
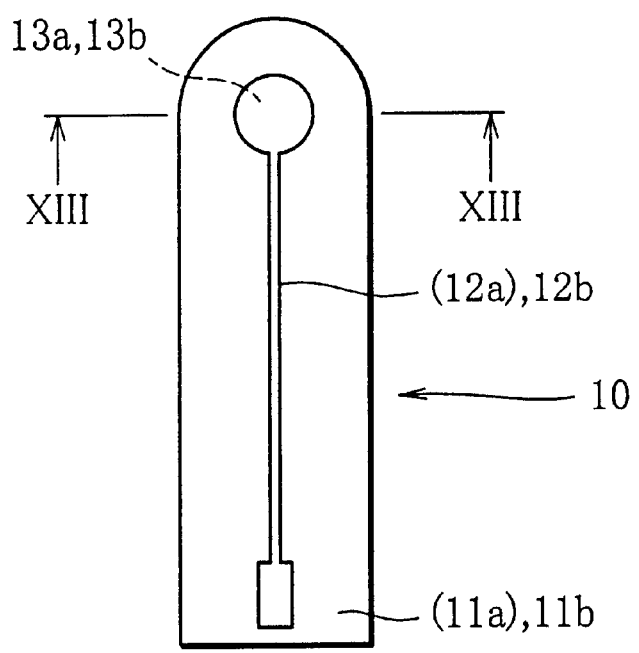
FIG. 12 is a plan view of the conventional film pressure sensor.

In the embodiments described above, the film pressure sensors can be used more conveniently if variation in the temperature sensing characteristics of each sensor is removed to allow the sensors to have consistent temperature characteristics. More specifically, this can be achieved by measuring the temperature-dependent change in the resistance value of the temperature-sensitive layer, and trimming the temperature-sensitive layer over a suitable area as indicated by the dotted line in FIG. 11A so that the temperature-sensitive layer may have prescribed electrical properties before it is covered with the insulating layer, or by forming a plurality of temperature-sensitive layers parallel wise across the circuit patterns, as shown in FIG. 11B, and measuring likewise the temperature-dependent change in the resistance values of the temperature-sensitive layers, followed by trimming of the temperature-sensitive layers so as to give prescribed electrical characteristics and leave suitable number of temperature-sensitive layers, before they are covered with the insulating layer. In In a trimming technique employed conventionally, taking, for example, a resistive element, it is notched or trimmed into a suitable size using a laser so that it may have a certain resistance value. However, this technique requires expensive equipment including a laser beam machine or the like. Meanwhile, the temperature sensing area formed on the film sensor can be trimmed by punching this area together with the films or by cutting with a knife and the like, and the present invention enjoys a greater cost merit, since it uses inexpensive equipment compared with the conventional technique.

Configurations of the circuit patterns, and those of the pressure-sensitive layers and the temperature-sensitive layer according to the film pressure sensors of the present invention are not, of course, limited to those as described in the above embodiments, nor the thickness of the silver ink, polyurethane resin, carbon ink, etc. is not to be limited to a specific small thickness.

INDUSTRIAL APPLICABILITY

As has been-described heretofore, the film pressure sensor according to the present invention is interposed between a cover and a seat cushion material such as urethane, for example, in an automotive seating equipment, a massager chair or a medical equipment such as a bed to be suitably used for sensing whether a person is seated or not on the seating equipment.

What is claimed is:

1. A pressure sensor comprising:

an insulating film;

a pressure sensing area formed on said insulating film, wherein the pressure sensing area detects changes in pressure; and a temperature sensing area comprising a substance whose electrical resistance varies with temperature, wherein the temperature sensing area is formed on said insulating film, wherein changes of the electrical resistance of the substance is indicative of errors in measurements of the pressure that is detected by the pressure sensing area, wherein said pressure sensing area and said temperature sensing area are in substantially direct electrical contact with each other and wherein such changes are detectable by an electronic device that is associated with the temperature sensing area.

2. The pressure sensor of claim 1, additionally comprising a circuit pattern having a portion coupled to both said pressure sensing area and said temperature sensing area.

3. The pressure sensor of claim 1, additionally comprising a circuit pattern connected to said pressure sensing area, wherein said circuit pattern forms said temperature sensing area.

* * * * *